United States Patent [19]
Suzuki

[11] Patent Number: 5,287,234
[45] Date of Patent: Feb. 15, 1994

[54] SPEED GAIN CONTROL BASED UPON ACCESS TIME FOR EACH CYLINDER

[75] Inventor: Nobuyuki Suzuki, Kawasaki, Japan

[73] Assignee: Fujitsu Limited, Japan

[21] Appl. No.: 811,798

[22] Filed: Dec. 20, 1991

[30] Foreign Application Priority Data

Dec. 21, 1990 [JP] Japan .................. 2-412639

[51] Int. Cl.⁵ .............................. G11B 5/596
[52] U.S. Cl. .................. 360/78.04; 360/78.06
[58] Field of Search ........... 360/78.09, 78.07, 49, 360/78.06, 78.11, 78.04

[56] References Cited

U.S. PATENT DOCUMENTS

| | | | |
|---|---|---|---|
| 4,331,987 | 5/1982 | Oda et al. | 360/78.06 X |
| 4,333,117 | 6/1982 | Johnson | 360/78.07 |
| 4,622,604 | 11/1986 | Hashimoto et al. | 360/78.07 |
| 4,899,234 | 6/1990 | Genheimer | 360/78.06 |
| 4,907,109 | 3/1990 | Seino | 360/78.07 X |
| 5,010,425 | 4/1991 | Asai | 360/78.04 |
| 5,063,454 | 11/1991 | Hashimoto | 360/78.04 |
| 5,150,266 | 9/1992 | Albert | 360/78.04 |
| 5,189,571 | 2/1993 | Murphy et al. | 360/75 |

FOREIGN PATENT DOCUMENTS

| | | |
|---|---|---|
| 0003070 | 7/1979 | European Pat. Off. . |
| 0111654 | 6/1984 | European Pat. Off. . |
| 62-189515 | 8/1987 | Japan . |
| 63-274395 | 11/1988 | Japan . |

*Primary Examiner*—Aristotelis Psitos
*Assistant Examiner*—James T. Wilson
*Attorney, Agent, or Firm*—Welsh & Katz, Ltd.

[57] ABSTRACT

A servo control method for a magnetic disk apparatus having at least one magnetic disk, at least one head and a motor driving the head has the following steps. The first step is to measure a reference velocity control time necessary for a seek operation between two predetermined tracks among a plurality of tracks of the magnetic disk. The second step is to measure a plurality of velocity control times necessary for a plurality of seek operations in which the head moves a distance equal to a distance between the two predetermined tracks. The plurality of seek operations respectively have seek starting positions. The third step is to generate compensation data which controls the velocity control times obtained at step (b) to be equal to the reference velocity control time. The fourth step is to adjust a seek current supplied to the motor located in a servo control loop on the basis of the compensation data generated at step (c).

10 Claims, 11 Drawing Sheets

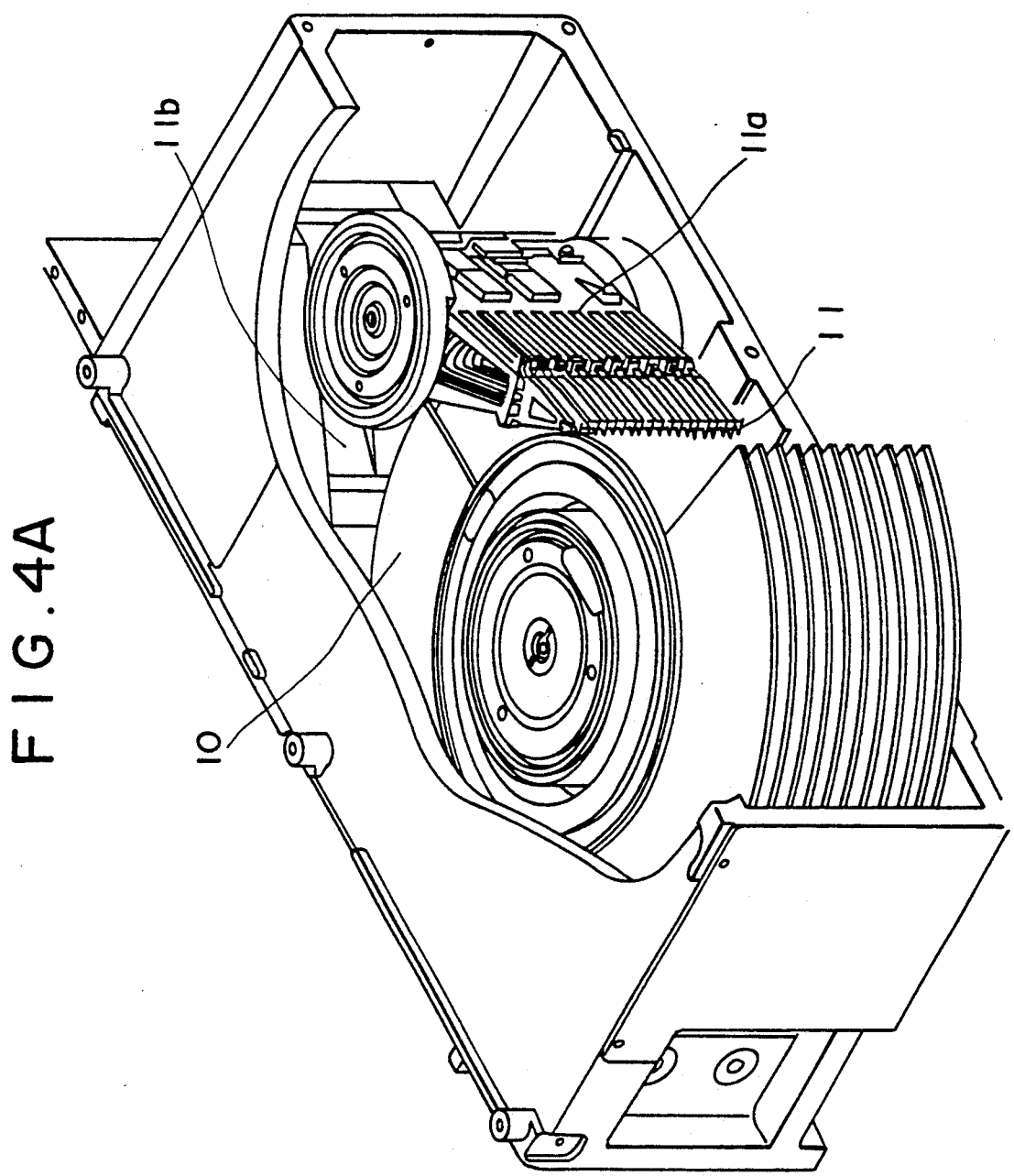

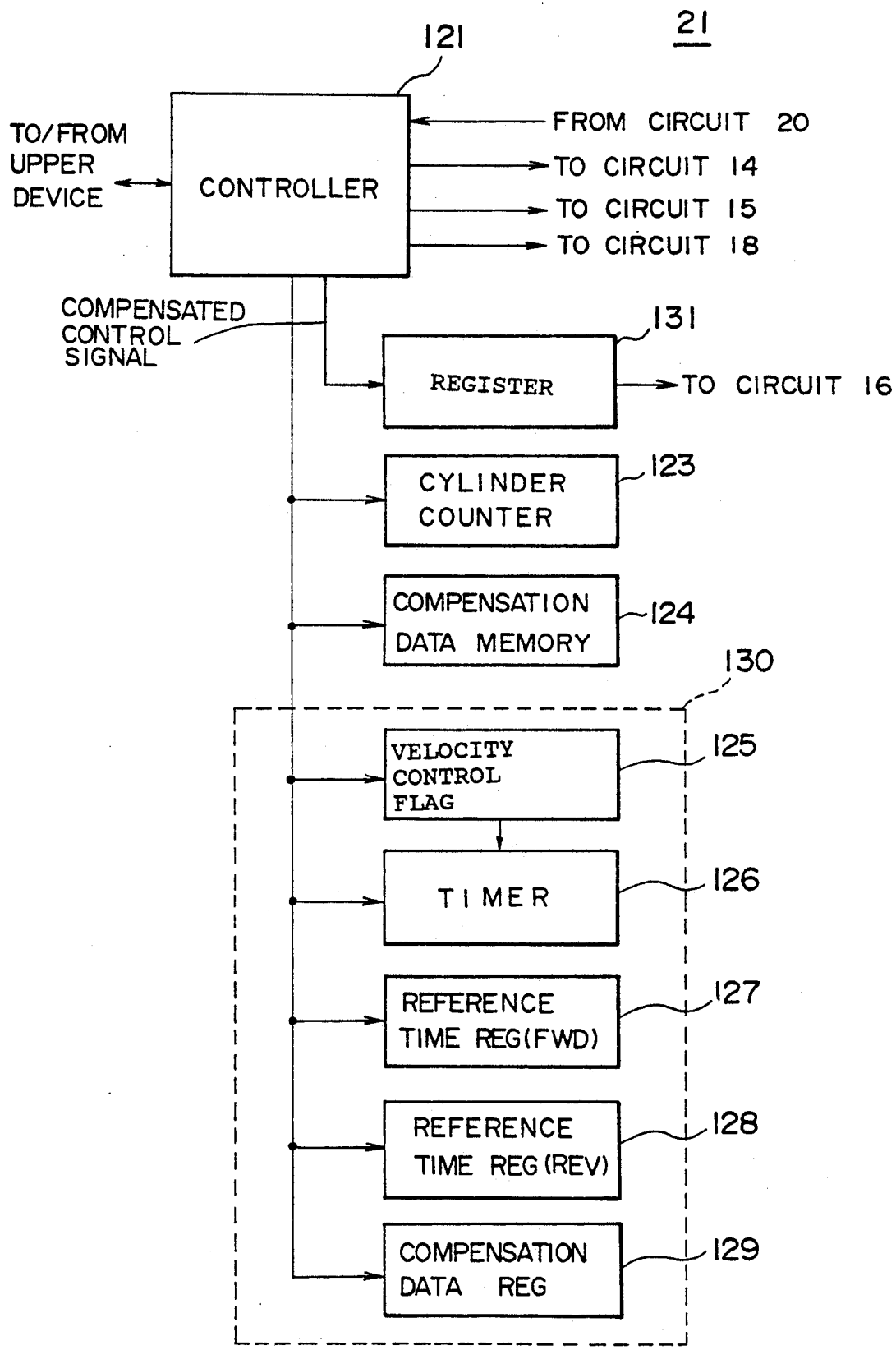

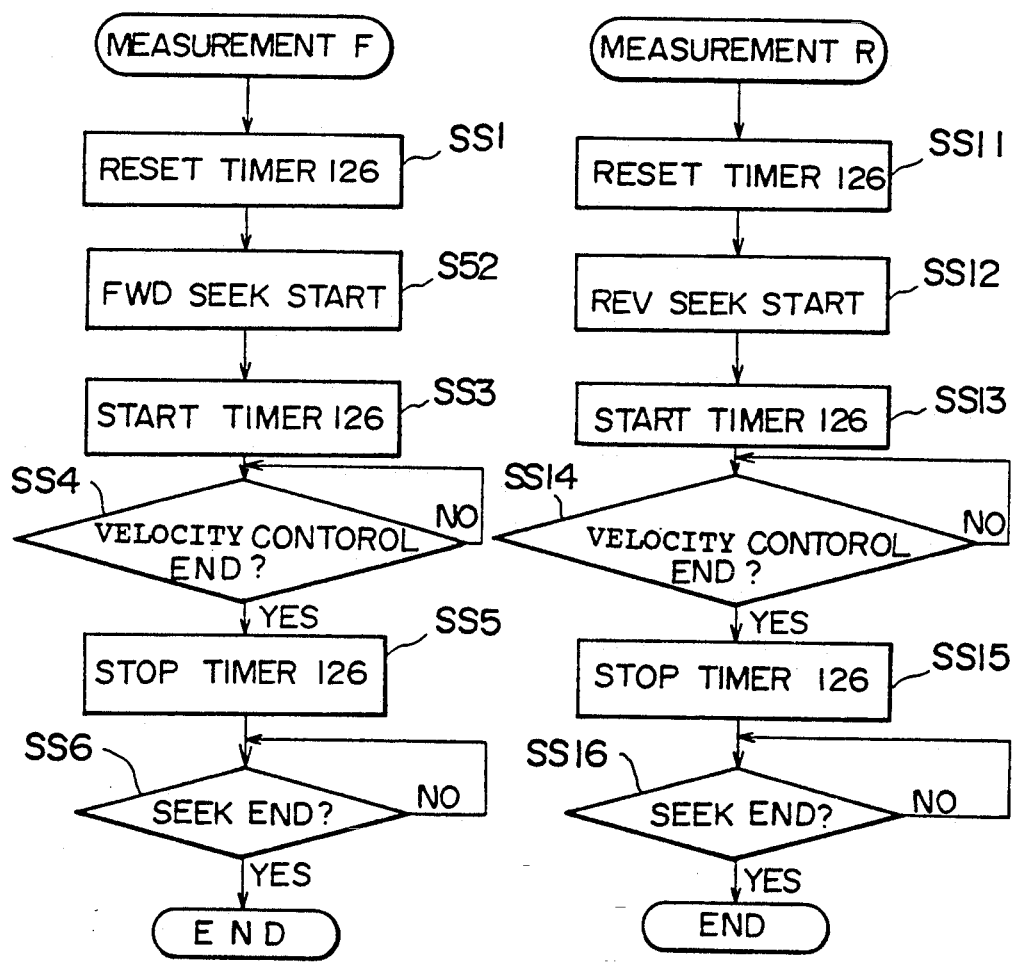

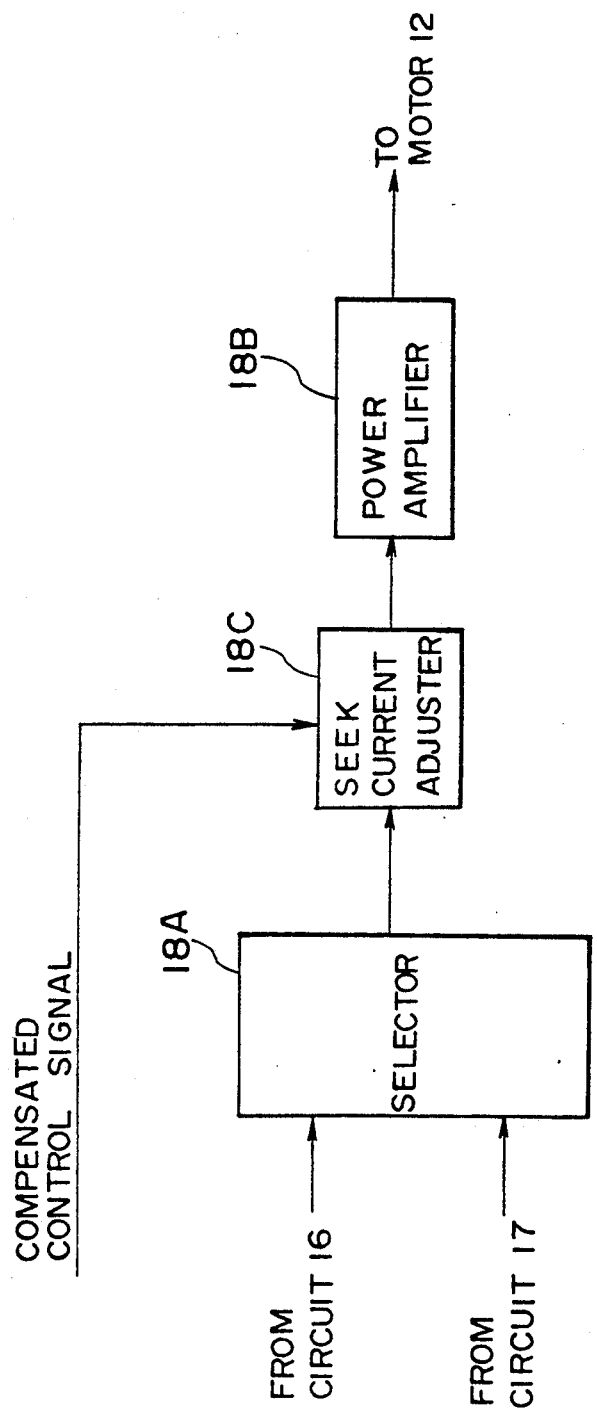

FIG. 9

| ADDRESS | COMPENSATION DATA | CORRESPONDING CYLINDER # |
|---|---|---|
| 0 | 1.4 | 0000..003F (HEX) |
| 1 | 1.3 | 0040..007F |
| 2 | 1.2 | 0080..00BF |
| 3 | 1.1 | 0000..00FF |
| 4 | 1.0 | 0100..013F |
| ... | ... | ... |
| 42 | 1.0 | 0A80..0ABF |
| 43 | 1.0 | 0AC0..0AFF |
| 44 | 1.1 | 0B00..0B3F |
| 45 | 1.2 | 0B40..0B7F |
| 46 | 1.3 | 0B80..0BBF |
| 47 | 1.4 | 0BC0..0BFF |

SPEED GAIN CONTROL BASED UPON ACCESS TIME FOR EACH CYLINDER

BACKGROUND OF THE INVENTION (1) Field of the Invention

The present invention generally relates to a magnetic disk apparatus, and more particularly to a servo control method for a magnetic disk apparatus (2) Description of the Prior Art A magnetic disk apparatus is widely used in various computer systems. A conventional disk apparatus includes a head positioning structure in which heads supported by a carriage are positioned by driving a voice coil motor fastened to the carriage. The velocity of the heads is controlled during a seek operation on magnetic heads. During the head velocity control procedure, the velocity of the heads is controlled to be equal to a target head velocity.

A force F expressed by the following formula is generated during the head velocity control procedure:

$$F = B \cdot L \cdot i \qquad (1)$$

where i is a current passing through a coil of the voice coil motor, L is the length of the coil, and B is a magnetic flux generated by a magnet of the voice coil motor. It will be noted that the magnitude of the magnetic flux B changes as the coil driven by the motor moves. In general, a large magnitude of magnetic flux B is obtained at a center portion of the magnet of the motor, and a small magnitude of magnetic flux is obtained at both end portions thereof. This phenomenon becomes greater as the size of the motor is decreased.

A problem arises from the above-mentioned uneven distribution of magnetic flux B. This problem will now be described with reference to FIGS. 1 and 2. FIG. 1 is a graph of the relationship between head positions P and a magnetic constant BL (the product of B and L), and FIG. 2 is a graph of the relationship between the head positions and seek time.

In FIG. 1, the head positions P are indicated by track numbers on which the magnetic heads are positioned. Track #180 is positioned at an inner surface portion of a magnetic disk, and track #0 is positioned at an outer surface portion thereof When the heads are positioned in a center portion of the disk, large fixed magnetic constants BL are obtained. The magnetic constant BL decreases as the heads moves to the inner or outer disk surface portion.

When the seek operation is carried out from track #65 to track #105 between which a large fixed magnetic constant BL is obtained, as indicated by curve A shown in FIG. 2 the heads move to and then stop on a target position 105 at time T3. The head velocity is controlled so that the heads are accelerated in approximately half the distance between the tracks #65 and #105 and decelerated in the second half of the distance. When it is recognized that the heads have reached the target position, the servo control process is switched to a position control process from the velocity control process.

When the seek operation is carried out between track #105 and track #145, between which tracks the magnetic constant BL varies, the heads move as indicated by curve B shown in FIG. 2. The velocity control process determines the head velocity assuming that the magnetic constant BL is fixed. However, in actuality, the magnetic constant BL starts to decrease at track #120. As the magnetic constant BL decreases, the force F defined by formula (1) decreases. Hence, it becomes difficult to decelerate the movement of the heads. The heads arrive at the target position at time T1 prior to time T2. As a result, the servo control process switches to the position control process at time T1. At time T1, the movement of the heads is not sufficiently decelerated, so that the heads overshoot the target position. The overshooting is gradually suppressed by the position control process, and hence the seek time increases. When the seek operation from track #145 to track #105 is carried out, the movement of the heads is not sufficiently accelerated, and hence the seek time increases. Further, Japanese Laid-Open Patent Application No. 63-274395 discloses a head positioning control process.

SUMMARY OF THE INVENTION

It is an object of the present invention to provide a servo control method for a magnetic disk apparatus in which the above disadvantages are eliminated.

A more specific object of the present invention is to compensate for variations in the magnetic constant based on the positions of the magnetic heads and thereby reduce the seek time.

These objects of the present invention are achieved by a servo control method for a magnetic disk apparatus having at least one magnetic disk, at least one head and a motor driving the head, the servo control method comprising the steps of:

(a) measuring a reference velocity control time necessary for a seek operation between two predetermined tracks among a plurality of tracks of the magnetic disk;

(b) measuring a plurality of velocity control times necessary for a plurality of seek operations in which the head moves a distance equal to a distance between the two predetermined tracks, the plurality of seek operations respectively having seek starting positions;

(c) generating compensation data which controls the velocity control times obtained at step (b) to be equal to the reference velocity control time; and (d) adjusting a seek current supplied to the motor located in a servo control loop on the basis of the compensation data generated at step (c).

BRIEF DESCRIPTION OF THE DRAWINGS

Other objects, features and advantages of the present invention will become more apparent from the following detailed description when read in conjunction with the accompanying drawings, in which:

FIG. 4A is a perspective view of a magnetic disk apparatus;

FIG. 5 is a block diagram of a control unit shown in FIG. 3;

FIGS. 6A, 6B, 7A and 7B are flowcharts of the operation of the preferred embodiment of the present invention;

FIG. 8 is a block diagram of a variation of the embodiment of the present invention; and FIG. 9 is a diagram showing the contents of a compensation data table memory shown in FIG. 5.

DESCRIPTION OF THE PREFERRED EMBODIMENT

Figure 3:
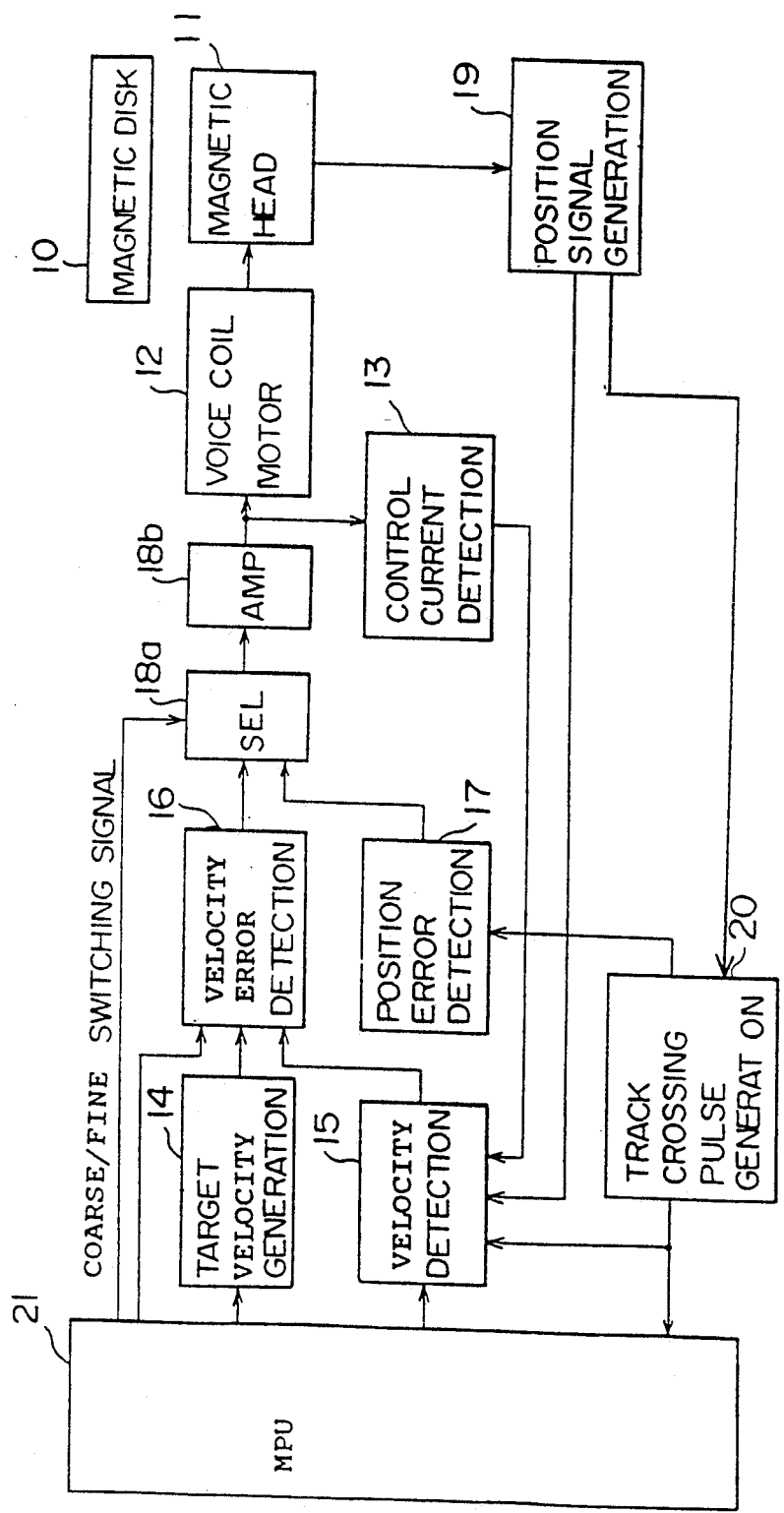
FIG. 3 is a block diagram of a preferred embodiment of the present invention.

FIG. 3 shows a servo control system of a magnetic disk apparatus, which apparatus has a plurality of magnetic disks 10 and a group of magnetic heads 11.

Figure 4B:
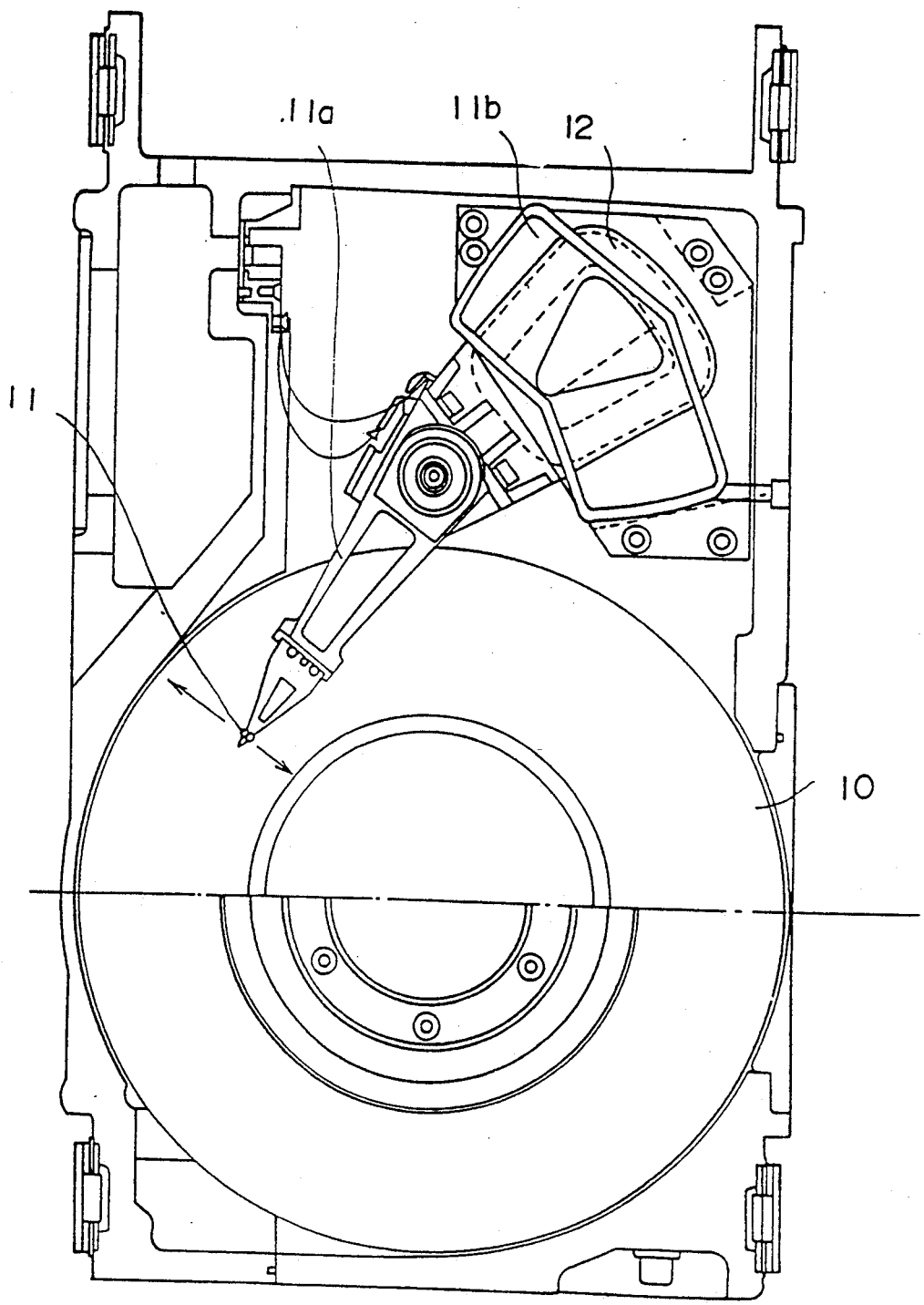
FIG. 4B is a plan view of the magnetic disk apparatus.

FIGS. 4A and 4B show a magnetic disk apparatus which includes the magnetic disks 10 and the magnetic heads 11. The magnetic disks 10 are spaced vertically apart from each other. One or two magnetic heads 11 are provided for each of the magnetic disks 10. The magnetic heads 11 are mounted on arms 11a, which are turned by a voice coil motor 12. A magnet 11b is provided as shown in FIGS. 4A and 4B.

For the sake of simplicity, the following description assumes that the magnetic disk apparatus has one magnetic disk 10 and one magnetic head 11. The voice coil motor 12 moves the magnetic head 11. A control current detection circuit 13 detects a current supplied to the voice coil motor 12.

A target velocity generation circuit 14 generates a target velocity signal corresponding to a target head velocity, which is referred to while the magnetic head 11 is being moved. A velocity detection circuit 15 detects the velocity of the magnetic head 11 and generates a velocity indication signal. A velocity error detection circuit 16 detects the difference between the target velocity signal generated by the target velocity generation circuit 14 and the velocity indication signal generated by the velocity detection circuit 15, and supplies the voice coil motor 12 with a seek current based on the above difference.

A position error detection circuit 17 detects the difference between a specified track position and the position of the magnetic head 11, and supplies the voice coil motor 12 with a seek current. A selector 18A selects either the output signal (seek current) of the velocity error detection circuit 1 or the output signal (seek current) of the position error detection circuit 17. A power amplifier 18B amplifies the selected seek current. An amplified seek current is applied to the voice coil motor 12 and the control current detection circuit 13.

A position signal generation circuit 19 receives a servo pattern which is recorded on a servo cylinder on the magnetic disk 10 and read out by the magnetic head 11, and generates a position signal indicating the position of the magnetic head 11 A track crossing pulse generation circuit 20 receives the position signal from the position signal generation circuit 19, and generates a pulse signal when the magnetic head 11 passes over a boundary between adjacent tracks.

A control unit 21 formed with, for example, a microprocessor (MPU), receives instructions from an upper device (not shown), and executes various control processes including a seek starting process and a coarse (velocity control)/fine (position control) control switching process, as will be described later. Hereinafter, the control unit 21 is referred to as MPU 21. In the coarse/fine process, the MPU 21 generates an instruction signal which shows whether the seek current to be supplied to the voice coil motor 12 should be derived from the velocity error detection circuit 16 or the position error detection circuit 17. In response to an instruction from the upper device, the MPU 21 instructs the target velocity generation circuit 14 to generate a signal corresponding to the target velocity suitable for moving the head 11 to the target position. This signal is output to the velocity error detection circuit 16.

The velocity detection circuit 15 calculates, from the output signal of the position signal generation circuit 19, the real movement velocity of the head 11, and outputs the velocity indication signal to the velocity error detection circuit 16. The velocity error detection circuit 16 outputs, to the voice coil motor 12 via the selector 18A and the power amplifier 18B, the seek current based on the difference between the output signal of the target velocity generation circuit 14 and the output signal of the velocity detection circuit 15. In this manner, the measurement of the magnetic head 11 is controlled.

The MPU 21 processes the signal from the track crossing pulse generation circuit 20, and outputs to the selector 18A a coarse/fine switching signal which indicates either the position control process or the velocity control process. When the control process switches to the position control process, the voice coil motor 12 becomes connected to the position error detection circuit 17. When the magnetic head 11 stops at the target position, the seek operation is completed.

FIG. 5 shows the structure of the MPU 21, which is composed of a control/operation unit (hereinafter simply referred to as a controller) 121, a cylinder counter 123, a compensation data table memory 124, a compensation data measurement unit 130 and a compensated control signal register 131. The compensation data measurement unit 130 is composed of a velocity control flag register 125, a timer 126, a reference time register 127 related to a forward direction, a reference time register 128 related to a reverse direction, and a compensation data register 129. The controller 121 controls the entire operation of the MPU 21.

The compensation data measurement unit 130 determines compensation data which compensates for variations in the magnetic constant BL of the voice coil motor 12 based on the positions of the magnetic head 11. The compensation data memory 124 stores the compensation data measured by the compensation data measurement unit 130. The compensation data measurement unit 130 measures the compensation data and writes it into the compensation data memory 124 before a normal operation of the magnetic disk apparatus starts or during an idle time when a data read/write operation is not being performed. The controller 121 reads out, from the compensation data memory 124, the compensation data related to a head position specified by the cylinder counter 123, and adjusts a control signal (current or voltage signal) output by the controller 121 in accordance with the readout compensation data, so that a compensated control signal is written into the register 131. The control signal generated in the controller 121 has a reference level for compensation data equal to 1.0. As will be described later, the compensated control signal read out from the register 131 functions to adjust the seek current output by the velocity error detection circuit 16. A servo control loop (feedback control loop) includes the magnetic head 11, the position signal generation circuit 19, the velocity detection circuit 15, the velocity error detection circuit 16, the selector 18A, the power amplifier 18B, and the voice coil motor 12.

Before describing in more detail the operation of the servo control system shown in FIG. 3, a description will now be given of the principle of the compensation procedure according to the present invention.

By using the aforementioned formula (1), a force Fs which moves the magnetic head 11 by means of the voice coil motor 12 located at a reference position where the magnetic head 11 is located at a center position can be expressed by the following formula:

$$Fs = BLs \cdot i \quad (2)$$

where BLs is a magnetic constant obtained at the reference position. Force Fp obtained at a position away from the reference position is written as follows:

$$Fp = BLp \cdot i \quad (3)$$

where BLp is a magnetic constant obtained at the above position away from the reference head position.

When the force Fs is equal to the force Fp, the velocity of the movement of the magnetic head 11 obtained at a position away from the reference position is identical to that of the magnetic head 11 obtained at the reference position. Further, the following is derived from formula (3):

$$Fp = Kp \cdot BLp \cdot i \quad (4)$$

where Kp is the compensation data (coefficient). By making formula (4) equal to formula (2), the following is obtained:

$$BLs \cdot i = Kp \cdot BLp \cdot i \quad (5).$$

Further, the following is obtained from formula (5):

$$Kp = BLs/BLp \quad (6).$$

Formula (6) means that a force having the same magnitude as that of a force obtained at the reference position (BLs) can be generated by multiplying the amount of seek current supplied to the voice coil motor 12 by the compensation coefficient Kp, and hence the magnetic head 11 moves in the inner or outer portion of the magnetic disk 10 at a velocity identical to that obtained in the reference position. The compensation coefficients Kp thus obtained are stored in the compensation data memory 124. It will be noted that the compensation coefficient Kp used at the reference position is set equal to 1.0 since BLp = BLs.

A description will now be given of the servo control process which is executed under the control of the MPU 21, with reference to FIGS. 6A, 6B, 7A and 7B.

Figure 6A:
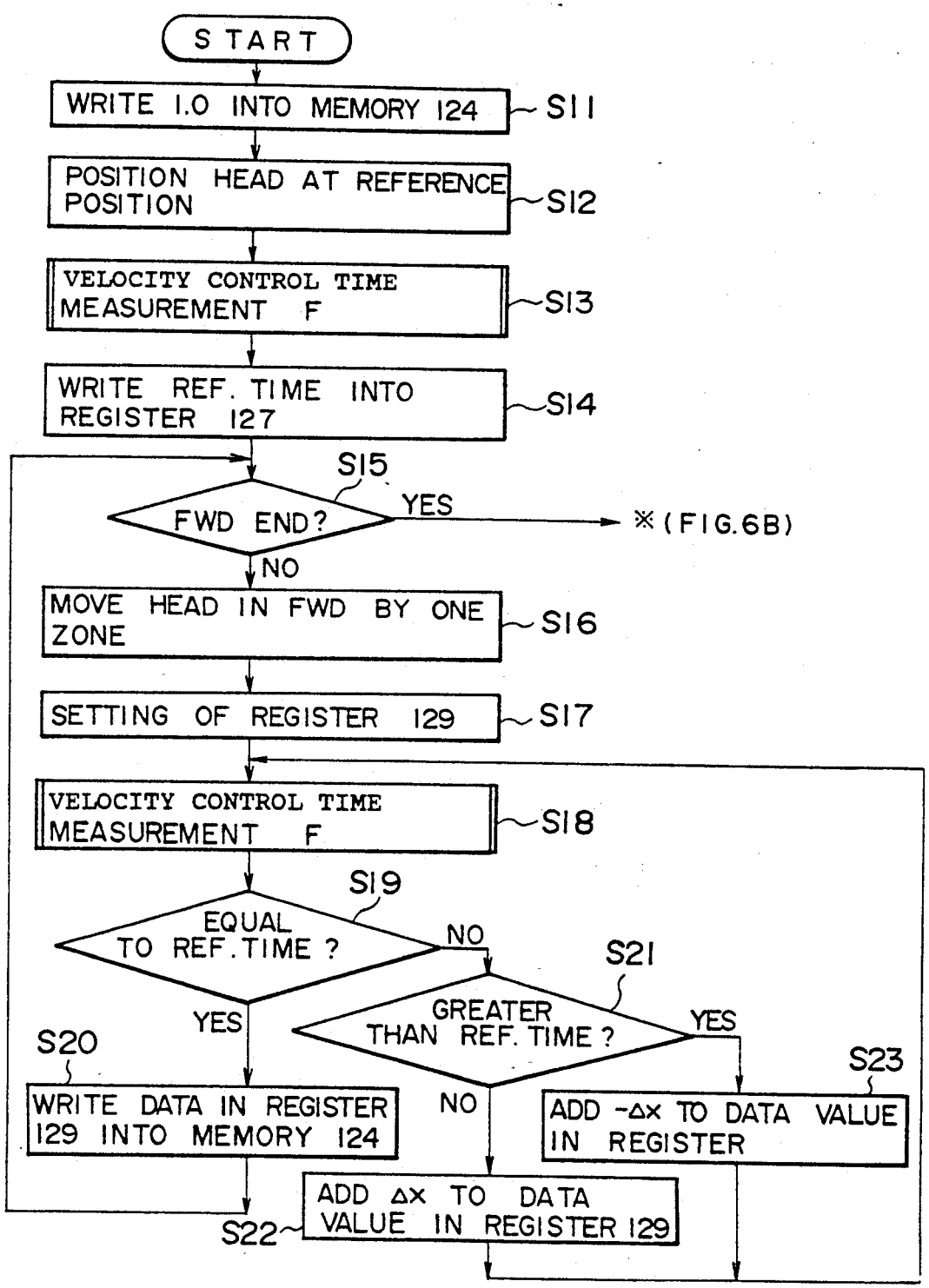

At step S11 shown in FIG. 6A, the controller 121 sets all data stored in the compensation data memory 124 to 1.0. At subsequent step S12, the controller 121 moves the magnetic head 11 to the reference position (at the center of the recording surface of the magnetic disk 10) in the forward (FWD) direction. The track numbers shown in FIG. 1 increase in the forward direction. Track #90 is located at the center of the recording surface of the magnetic disk 10, and is the reference position. At step S12, the magnetic head 11 is moved to, for example, track #75. More specifically, the tracks are grouped into a plurality of zones. In the example shown in FIG. 1, one zone consists of 10 tracks. Since the center of the recording surface is track #90, the compensation data on the range of tracks 91-100 is measured. The seek operation on the tracks 91-100 starts at track #75 (seek starting position), and ends at track 115 (target seek ending position). The seek starting position related to tracks 101-110 is track #85, and the target seek ending position related thereto is track #125. In this manner, a plurality of identical seek distances are defined and the compensation data for each identical seek distance is measured.

At step S13, the controller 121 starts a procedure F for measuring the time it takes for the velocity control process to be executed. The controller 21 writes a velocity control flag in the register 125 and starts the timer 126. At step S14, the controller 21 writes, into the reference timer register 127, the time which is measured at step S13 and serves as a reference time. At subsequent step S15, the controller 21 determines whether or not the measurement in the forward direction has ended. When the result of this determination is YES, the controller 121 executes step S24 shown in FIG. 6B. On the other hand, when the result obtained at step S15 is determined to be No, the controller 121 executes step S16.

At step S16, the controller 121 makes the magnetic head 11 move a distance equal to one zone in the forward direction and then stops it at this position. That is, the previous seek starting position is track #75 and hence the controller 121 moves the magnetic head 11 to track #85. At step S17, the compensation data about the zone prior to the currently measured zone by one zone (in the reverse direction) is read out from the compensation data memory 124 and written into the compensation data register 129.

Figure 1:
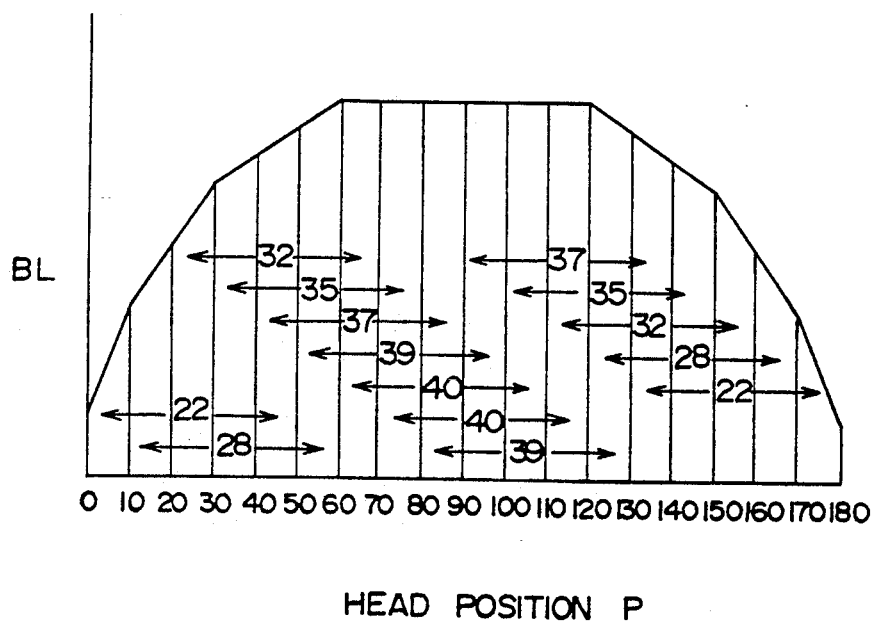
FIG. 1 is a graph of the relationship between the magnetic constant and head positions.
Figure 2:
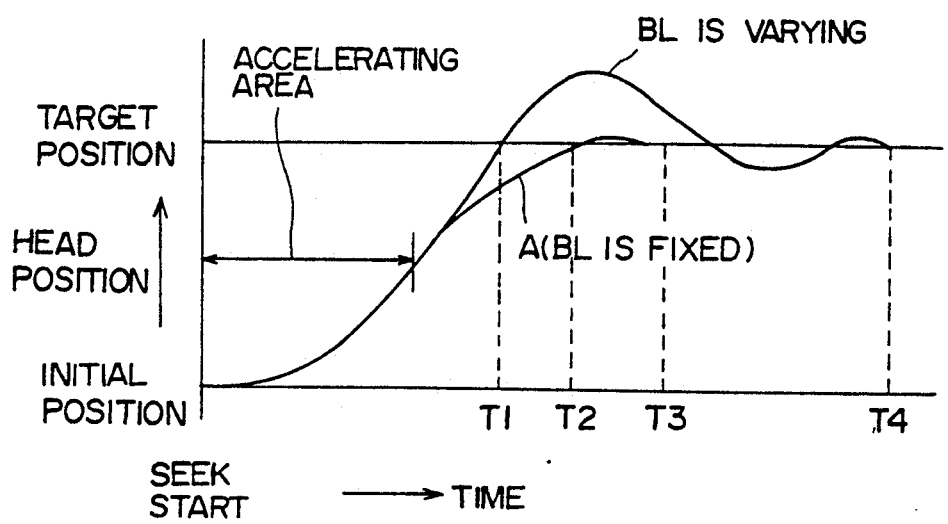
FIG. 2 is a graph of the relationship between the head positions and seek time.

Referring to FIG. 1, in order to measure the compensation data on the zone between tracks #91 and #100, the seek operation is carried out from track #75 to track #115. The seek operation is carried out from track #85 to track #125 in order to measure the compensation data on the zone between tracks #101 to #110. At step S17, the measurement data on the previously measured zone, that is, the zone from track #91 to #100, is written, as initial compensation data, into the compensation data register 129. With this arrangement, it becomes possible to reduce the time needed to obtain the compensation data.

At step S18 shown in FIG. 6A, the controller 121 starts the procedure F for measuring the time it takes for the velocity control process to be executed in the same manner as at step S13. At step S19, the controller 121 determines whether or not the reference time stored in the register 127 is identical to the time measured at step S18. When the result obtained at step S19 is YES, the controller 121 executes step S20. On the other hand, when the result obtained at step S19 is NO, the controller 121 executes step S21.

Figure 6B:
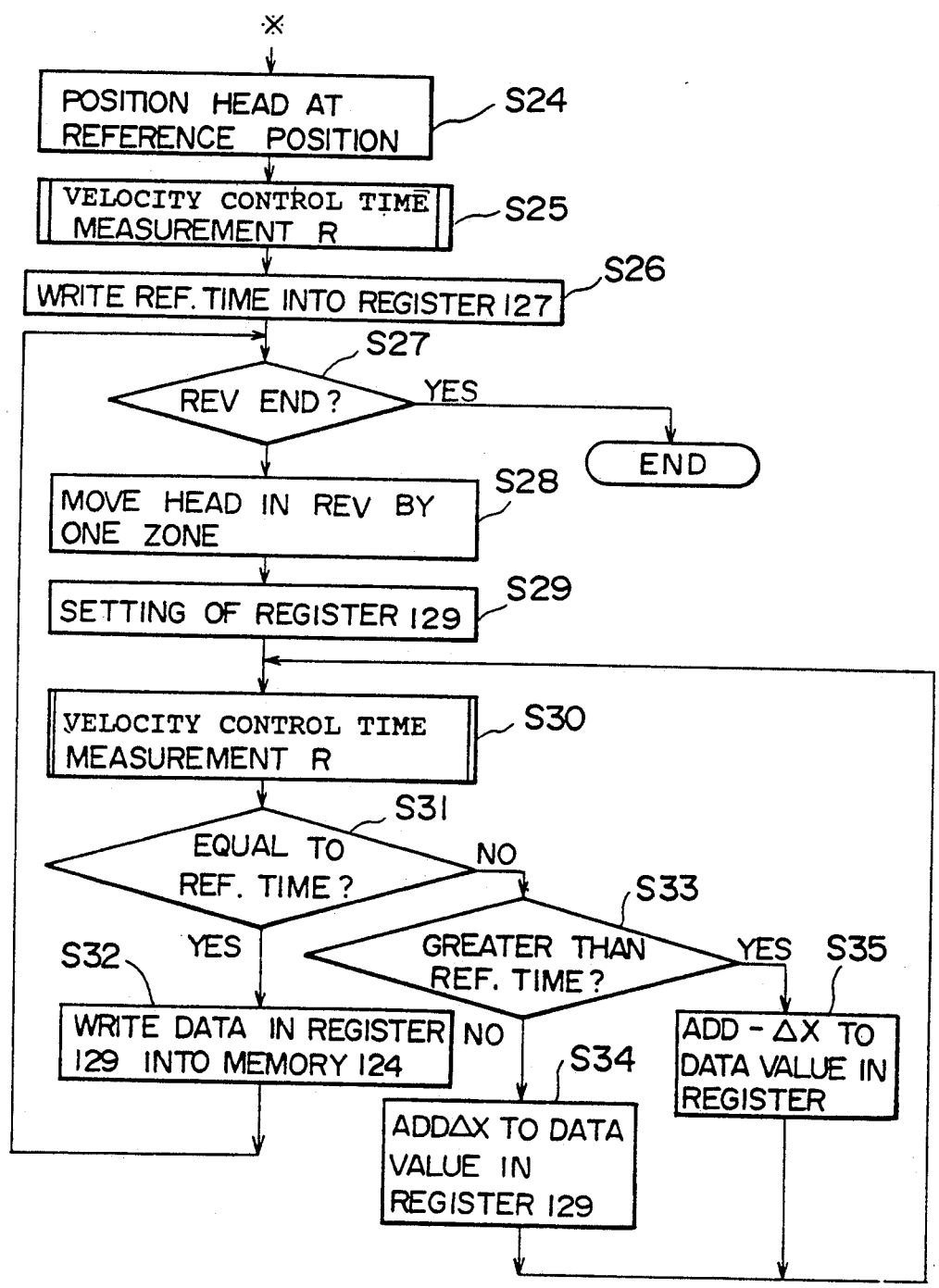

At step S21, the controller 121 determines whether or not the time measured at step S18 is greater than the reference time stored in the register 127. When the result obtained at step S21 is NO, a small fixed value Δx equal to, for example, 0.01, is added to the compensation data stored in the register 129. When the result obtained at step S21 is YES, a fixed small value −Δx equal to, for example, −0.01, is added to the compensation data stored in the register 129. After step S22 or step S23 is executed, the procedure returns to step S18. After a loop consisting of steps S18, S19 S21 and S22 or S23 is repeatedly executed, the result obtained at step S19 becomes YES, and step S20 is executed. At step S20, the compensation data stored in the register 129 is written into the compensation data memory 124 under the control of the controller 121. When all measurement data about all the zones have been obtained by moving the magnetic head 11 in the forward direction, the result obtained at step S15 becomes YES, and step S24 shown in FIG. 6B is executed.

At step S24, the controller 121 moves the magnetic head 11 to a reference position (at the center of the disk surface in the reverse direction). The compensation data about the zone from track #91 to track #100 has been measured in the forward direction, and thus the controller 121 moves the magnetic head 11 to track #105 which is a seek starting position of the zone from track #90 to track #81. At step S25, the controller 121 starts a procedure R for measuring the time it takes for the velocity control process to be executed in the same manner as at step S13. At step S26, the controller 121 writes, as a reference time, the time obtained at step S25 into the register 128.

At step S27, the controller 121 determines whether or not all compensation data in the reverse direction have been obtained. When the result obtained at step S27 is YES, the controller 121 ends the procedure shown in FIG. 6B. When the result at step S27 is NO, the controller 121 executes step S28 at which step the magnetic head 11 is moved a distance equal to one zone in the reverse direction. At subsequent step S29, the controller 121 reads out the compensation data about the previous zone in the forward direction from the compensation data memory 124, and writes it into the compensation data register 129. At step S30, the controller 121 executes the time measuring procedure R in the same manner as at step S26. Steps S31-S35 are executed in the same manner as steps S19-S23.

FIG. 7A shows the time measuring procedure F executed at the steps S13 and S18 shown in FIG. 6A. At step SS1, the controller 121 resets the timer 126 to zero. At step SS2, the controller 121 starts the seek operation in the forward direction. At step SS3, the controller 121 starts the timer 126. At step SS4, the controller 121 determines whether or not the velocity control process should be terminated by referring to the status of the coarse/fine switching signal sent to the selector 18A. When the result obtained at step SS4 becomes YES, the controller 121 stops the timer 126 at step SS5 and resets the flag in the register 125. After terminating the velocity control process, the controller 121 starts the position control process, and determines whether or not the seek operation has been completed by referring to the head velocity and the head position. When the result obtained at step SS6 is YES, the controller 121 ends the time measuring process shown in FIG. 7A.

FIG. 7B shows the time measuring procedure R executed at steps S25 and S30 shown in FIG. 6B. Steps SS11-SS16 are executed in the same manner as steps SS1-SS6 except that the magnetic head 11 is moved in the reverse direction at step SS12.

In the manner described with reference to FIGS. 6A, 6B, 7A and 7B, all compensation data are stored in the compensation data memory 124. The measurement procedures shown in these figures are executed before the normal read/write operation starts or during an idle time during which the read/write operation is not executed.

The controller 121 receives the read/write instruction from the upper device (not shown), and calculates the head number related to data to be recorded or read out from the magnetic disk. Then the controller 121 starts the seek operation. The controller 121 calculates the current head position from the output signal of the track crossing pulse generation circuit 20, and outputs the target velocity indication signal to the target velocity generation circuit 14. The controller 121 knows the current head position, which is registered in the cylinder counter 123, and reads out the corresponding compensation data from the compensation data memory 124. The controller 121 adjusts the control signal on the basis of the readout compensation data, and writes the compensated control signal into the register 131. This adjustment procedure is carried out by, for example, multiplying the control signal by the readout compensation data. As has been described previously, the control signal has the reference level equal to 1.0 of compensation data.

The compensated control signal read out from the register 131 is output to the velocity error detection circuit 16, the output of which is adjusted by the compensated control signal. As shown in FIG. 8A, it is also possible to adjust the seek current by a seek current adjuster 18C between the selector 18A and 18B, as shown in FIG. 8. The seek current adjuster 18C amplifiers or attenuates the seek current on the basis of the compensated control signal from the MPU 21. With this arrangement, it becomes possible to adjust the seek current on the basis of the compensated control signal during the fine control procedure.

FIG. 9 shows a format of the compensation data memory 124 shown in FIG. 5. The compensation data and the corresponding cylinder number for each address are stored. In the example shown in FIG. 9, 3072 cylinders are grouped into 48 zones. The address of the memory corresponding to the cylinder number is defined as follows:

(address) = INT(cylinder number/64)

where INT(x) is an integer function. In a boundary between adjacent zones, the compensation data may vary stepwise. In this case, the compensation data is obtained by interpolation based on the cylinder numbers.

According to the present invention, the seek current is compensated for based on the compensation data related to the head position. Thus, fixed seek performance is obtained and the seek time obtained at end portions of the magnetic disk 10 can be greatly reduced. The compensation data for compensating for variations in the magnetic constant BL is obtained by shifting each of the seek starting positions by the identical distance and determining that the velocity control time has become equal to the reference time. Thus, it is not necessary to execute a complex calculation. Further, the initial compensation data used for obtaining the compensation data for each zone is the compensation data about the immediately previous adjacent zone. Hence it becomes possible to reduce the time necessary to obtain the compensation data.

The present invention is not limited to the specifically disclosed embodiment, and variations and modifications may be made without departing from the scope of the present invention.

What is claimed is:

1. A servo control method for a magnetic disk apparatus having at least one magnetic disk, at least one head and a motor driving the head, said servo control method comprising the steps of:
    (a) measuring a reference velocity control time necessary for a seek operation between two predetermined tracks among a plurality of tracks of the magnetic disk said two predetermined tracks being located at seek starting and ending positions;

(b) measuring a plurality of velocity control times necessary for a plurality of seek operations in which the head moves a distance equal to a distance between said two predetermined tracks, said plurality of seek operations respectively having seek starting positions;

(c) generating a plurality of compensation data for each of said seek operations, which controls the velocity control times obtained at step (b) so that the velocity control times are each equal to said reference velocity control time, said compensation data compensating for variations in a magnetic constant of the motor based on positions of the head; and (d) adjusting a seek current supplied to the motor located in a servo control loop on the basis of the compensation data generated at step (c).

2. A servo control method as claimed in claim 1, wherein:

said step (b) comprises a step (b−1) of measuring a first velocity control time which is one of the velocity control times by moving, in a predetermined direction, the head from a first seek starting position which is one of said seek starting positions;

said step (c) comprises a step (c−1) of generating compensation data related to a first zone starting from said first seek starting position having said distance;

said step (d) comprises a (d−1) of adjusting the seek current based on the compensation data related to said first zone; and said step (b) comprises a step (b−2) of measuring a second velocity control time which is one of the velocity controls times by moving, in the predetermined direction, the head starting from a second seek starting position which is one of said seek starting positions and which is adjacent to said first seek starting position in the predetermined direction while the seek current adjusted at said step (d−1) is being applied to the motor.

3. A servo control method as claimed in claim 2, wherein said step (c) comprises a step (c−2) of generating compensation data related to a second zone starting from said second seek starting position by using the compensation data related to said first zone to determine a difference between the first velocity control time and the second velocity control time and use the difference as a basis for generating compensation data related to a second zone.

4. A servo control method as claimed in claim 2, wherein said step (c) comprises the steps of:

(c−2) decreasing a value of the compensation data related to the first zone when the second velocity control time is greater than said first velocity control time; and (c−3) increasing the value of the compensation data related to the first zone when the second velocity control time is smaller than or equal to said first velocity control time.

5. A servo control method as claimed in claim 2, wherein said predetermined direction is a forward direction in which the head moves toward an outer surface portion of the magnetic disk.

6. A servo control method as claimed in claim 2, wherein said predetermined direction is a reverse direction in which the head moves toward an inner surface portion of the magnetic disk.

7. A servo control method as claimed in claim 1, wherein:

said step (d) comprises a step (d−1) of changing said velocity error signal on the basis of the compensation data; and said servo control method comprises a step (e) of generating a velocity error signal which indicates a differences between a real velocity of the head and a target velocity.

8. A servo control method as claimed in claim 1, wherein said step (d) comprises a step (d−1) of amplifying the seek current on the basis of the compensation data.

9. A servo control method as claimed in claim 1, wherein said step (d) comprises a step (d−1) of attenuating the seek current on the basis of the compensation data.

10. A servo control method as claimed in claim 1, wherein:

said servo control method comprises a step (e) of detecting a current position of the head; and said step (d) adjusts the seek current on the basis of the compensation data corresponding to the current position of the head.

* * * * *

UNITED STATES PATENT AND TRADEMARK OFFICE
CERTIFICATE OF CORRECTION

PATENT NO. : 5,287,234
DATED : February 15, 1994
INVENTOR(S) : Nobuyuki Suzuki

It is certified that error appears in the above-indentified patent and that said Letters Patent is hereby corrected as shown below:

Column 1, line 46, after "thereof" insert --.--.

Column 3, line 40, delete "1" and insert --16--.

Column 3, line 49, after "11" insert --.--.

Column 6, line 7, delete "21" and insert --121--.

Column 6, line 9, delete "21" and insert --121--.

Column 6, line 12, delete "21" and insert --121--.

Column 6, line 17, delete "No" and insert --NO--.

Signed and Sealed this

Fourth Day of April, 1995

Attest:

BRUCE LEHMAN

Attesting Officer    Commissioner of Patents and Trademarks